G. REKERS.
ELECTRIC MOTOR.
APPLICATION FILED FEB. 15, 1915.

1,291,144.

Patented Jan. 14, 1919.
2 SHEETS—SHEET 1.

Inventor
Gerret Rekers
By his Attorney
Lyman E. Dodge

G. REKERS.
ELECTRIC MOTOR.
APPLICATION FILED FEB. 15, 1915.

1,291,144.

Patented Jan. 14, 1919.
2 SHEETS—SHEET 2.

UNITED STATES PATENT OFFICE.

GERRET REKERS, OF ROCHESTER, NEW YORK, ASSIGNOR TO GENERAL RAILWAY SIGNAL COMPANY, OF GATES, NEW YORK, A CORPORATION OF NEW YORK.

ELECTRIC MOTOR.

1,291,144.      Specification of Letters Patent.      Patented Jan. 14, 1919.

Application filed February 15, 1915. Serial No. 8,211.

*To all whom it may concern:*

Be it known that I, GERRET REKERS, a citizen of the United States, and a resident of the city of Rochester, in the county of Monroe and State of New York, have invented a new and useful Electric Motor, of which the following is a specification.

This invention relates to an improved reversible electric motor and in the form described is operable on either alternating or direct currents, the particular form shown and described being a series motor.

The main object of this invention is to provide an electric motor which will permit obtaining reversibility by merely changing one connecting lead and thereby secure reversibility with the simplest possible switching means and simplest possible wiring connections. A further object of my invention is to secure reversibility in this manner and yet avoid the use of auxiliary windings or other auxiliary controlling means.

Motors to which my invention is applicable are of the commutator type and the main feature of my invention is the provision of three brushes on the commutator so located with reference to each other and to the field element of the motor that the direction of rotation may be reversed by merely shifting the connection of current supply from one of the three brushes to another of the three brushes, the remaining brush being permanently connected to the other supply wire. It is also important in motors embodying my invention in order to secure satisfactory efficiency, torque and minimum sparking at the brushes, to combine with the brush positions various additional features such as a distributed field winding, an incommensurate relation of armature and field slots, and a comparatively large number of commutator bars. If one or more of these features are not utilized, the operation will not be as satisfactory, unless other means giving equivalent results are utilized.

The following description and accompanying drawings disclose my preferred embodiment of my invention, although the construction described may be departed from and yet be within the scope thereof as defined in the claims.

Figure 1:
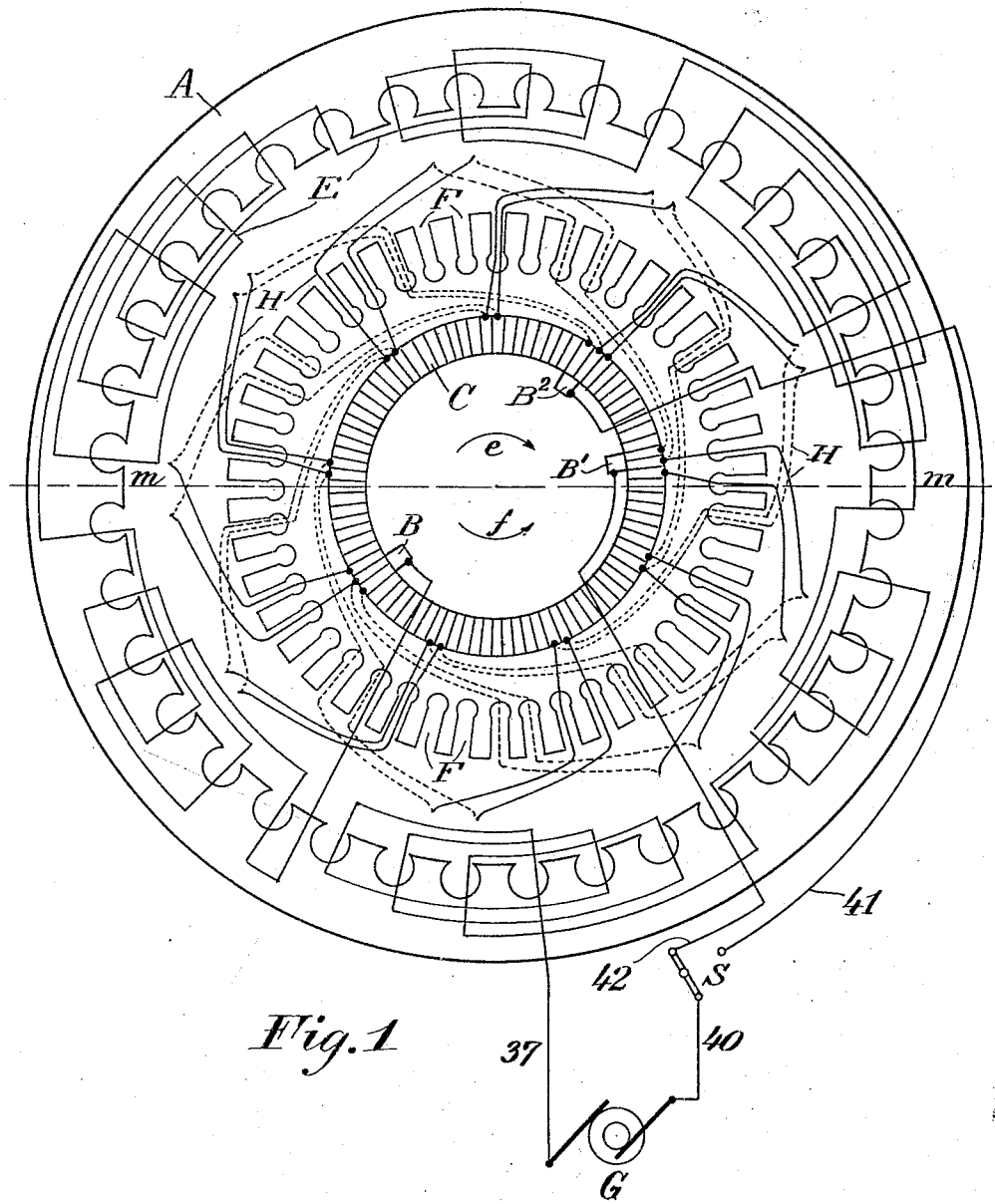
Figure 2:
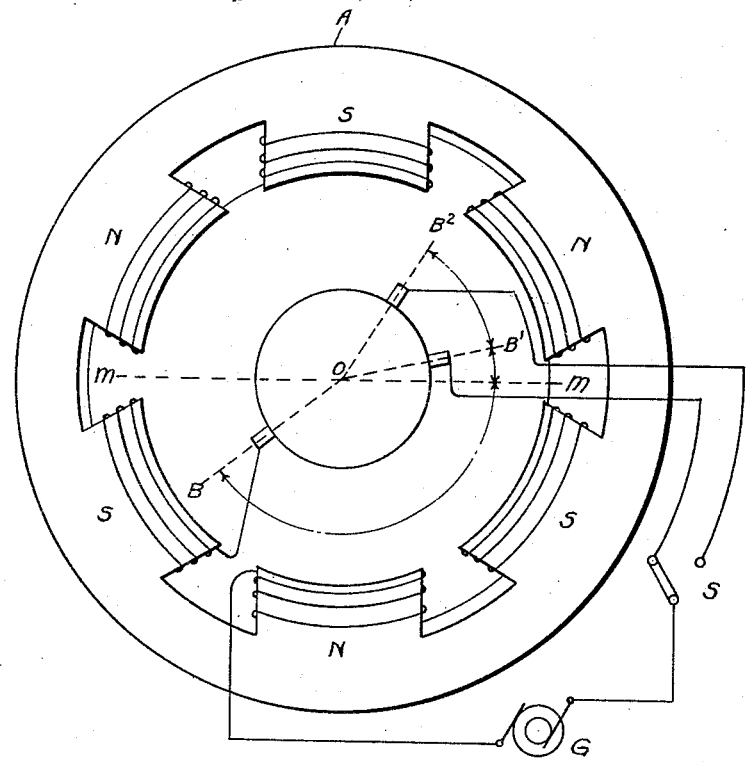

Figure 1 is the diagram of a motor embodying my invention, and Fig. 2 is a diagram for more clearly illustrating the principle of operation of the motor shown in Fig. 1.

A designates a field magnet element in the form of a laminated ring having its inner surface slotted for the reception of the field windings E, there being in the form shown thirty-six such slots as numbered in Fig. 1, and the field magnet is wound with windings as indicated to form six field poles of alternate polarity.

The commutator bars are indicated at C in the central portion of Fig. 1, there being eighty-eight bars in the form shown.

The armature core of the motor is laminated and has slots F on its periphery for the reception of the armature windings H in the usual manner.

The armature is wave wound, or series wound, in the usual manner as indicated in Fig. 1 requiring only two brushes for the six pole motor shown. The number of slots in the armature in the form shown is 44 and equal in number to one-half the number of commutator segments, the armature windings being conventionally indicated in Fig. 1 and wound to coöperate with the six field poles. Only a few of the complete circuits around the armature have been shown, to prevent undue confusion. It will also be understood that the armature windings and field windings are made up of a large number of turns in each coil of the field and armature coils.

A source of current is designated at G, which supplies energy to the supply lines 37, 40. From the supply line 37 the circuit continues through the field windings, being all in series in the form shown and then passes through the brush B on the commutator; after passing through the armature windings the circuit continues from brush B' to the lead 42 and thence through a switch S to the other supply line 40. When the switch S is shifted to connect the lead 41 to the supply line 40, the circuit from the armature windings continues from brush $B^2$ to the supply line 40, instead of from the brush B'. The mere shifting of the switch S therefore connects either brush B' or $B^2$ to the supply circuit and by this change of connection, the motor is caused to rotate in opposite directions.

This operation is attained by proper brush positions on the armature commutator with reference to the field poles. The brush B is shifted considerably from the neutral position. That is, the coil or coils of the armature which are short circuited by the brush B are considerably displaced from the neutral position. The brush B² is located in such position that the armature coil or coils short circuited thereby are located in such position, as to create resultant polarities on the armature relatively to the field poles to give a torque tending to rotate the armature in one direction, which we may assume as counter-clockwise as indicated by the arrow $f$. The brush B′ is displaced from the brush B² by such an amount that when current flows through the brush B′, instead of the brush B², the polarities created on the armature give a resultant torque in the opposite direction indicated by arrow $e$.

The principle may be better understood from Fig. 2 wherein for convenience the field poles are represented as salient poles and marked with alternate polarities N, S as shown.

The line $m\ m$ represents a neutral line between field poles. The line OB represents the brush position of the main brush B in relation to the field poles and also represents the location of an armature coil which is being short-circuited by brush B. The line OB² represents the position of the brush B² with reference to the field and also the position of an armature coil short circuited by brush B². The line OB′ represents the position of brush B′ with reference to the field and also the location of an armature coil short circuited by brush B′.

In an armature the location of the poles created by the flow of current through the armature windings corresponds approximately with the location of the coils undergoing commutation by the brushes; that is, the middle of the armature poles corresponds approximately with the position of the coils short circuited by the brushes. Thus, an armature pole under the above assumptions will be located on the line OB; similarly when connection of the line is made to brush B², an armature pole is created on the line OB²; and likewise when connection is made to the brush B′ an armature pole is created on the line OB′. Also with the series or wave wound armature in a multipole motor and with only two brushes in use, poles are created, or tend to be created, distributed over the armature corresponding with the respective brush positions, the resultant armature polarities depending upon the relative brush positions of the pair of brushes which are in service.

If we assume that the armature current creates or tends to create, a south pole on the armature on line OB, then the armature current creates a north pole on the line of each of the brushes B², B′ when either one of said brushes is in service. With a south pole on the line OB and a north pole on the line OB², the rotation of the armature will be counter clockwise, because the resultant armature poles in coöperation with the field poles set up a torque tending to turn the armature counter-clockwise as is apparent from Fig. 2. With the line connected to brush B′, instead of brush B², and a north pole on the line OB′, the line of magnetization is shifted in relation to the field poles so as to secure a torque tending to turn the armature in the opposite direction, or clockwise. This clockwise direction will result under these conditions because the north pole on the line OB′ is so much to the other side of the middle line of the field poles that a stronger torque in the clockwise direction is created than is created in the reverse direction by the small displacement of the brush B from the central line of the field poles giving a resultant rotation in a clockwise direction.

In the instance shown, the torque in the clockwise direction will not be as large as the torque obtained in the counter clockwise direction. If the brush B and armature coils short circuited thereby were located so as to be in line with the middle line of the field poles then the torque obtained in each direction would be equal in amount, provided the brushes B′ B² were displaced the same angular amount on opposite sides of a central line through the field poles. With the brush B shifted somewhat to one side of the central line of the field poles as shown in the drawings, then the torque in opposite directions will be unequal for the reasons above explained, but this unequal torque in opposite directions may be desirable in some instances in practice where the load placed upon the motor in one direction is less than that in the opposite direction. Variations of torque in the two directions is also dependent upon the relative displacement of the brushes B′ and B² with reference to the field poles, the securing of rotation in opposite directions being dependent upon the relative location of the poles created in the armature to the field poles.

It will be understood that with a multipole motor having a series or wave wound armature as described, the polarities created on the armature will assume resultant positions depending upon the positions of the brushes utilized, but the principle of operation remains as above described.

Although I have described one embodiment of my invention, it will be understood that my invention may be embodied in other types of motors than the particular type shown and that the particular form of construction may be departed from without passing beyond the scope of my invention.

What I claim is:

1. In a series commutator electric motor having a field winding, an armature winding and a commutator, a first brush and a second brush disposed in relation to the field poles to create armature poles causing rotation in one direction, an extra brush displaced in position with reference to the second brush and disposed in relation to the field poles to create armature poles causing rotation in the opposite direction, and means for establishing at will an electrical connection for supplying current to the motor through the field winding in series with the armature winding either across the first and second brushes or the first brush and the extra brush respectively, whereby the armature may be caused to rotate in either direction by merely changing the brush connections.

2. In a series commutator motor having a field winding, an armature winding and a commutator, a main brush connected to one terminal of the field winding, a second brush and a third brush displaced in position to create armature poles on opposite sides of the middle line of each field pole, and means for establishing at will an electrical connection for supplying current to the motor between the other terminal of the field winding and either the second brush or third brush respectively, whereby the armature may be caused to rotate in either direction by merely shifting a connection from one brush to another.

3. In a series commutator motor having a field winding, an armature and a commutator, a main brush displaced in one direction from neutral position, a second brush displaced in the same direction from its neutral position and located in position to create an armature pole at one side of the middle line of each field pole, a third brush displaced in position to create an armature pole at the other side of the middle line of each field pole, and means for establishing at will an electrical connection for supplying current to the motor through the field winding in series with the armature winding across either the main brush and the second brush or the main brush and third brush respectively, whereby the armature may be caused to rotate in either direction at will by merely changing the brush connections.

4. In a series commutator motor having a distributed field winding, a series-wound armature winding, and a commutator, a main brush connected to one terminal of the field winding, the other terminal of the field winding being adapted to be connected to an operating circuit including a source of electrical energy, a second brush located in position to create an armature pole at one side of the middle line of each field pole, a third brush located to create an armature pole at the other side of the middle line of each field pole, and means for changing the connection from the operating circuit to either said second brush or said third brush, whereby the armature may be caused to rotate in either direction at will by merely changing the connection from one brush to another.

5. In a series commutator motor having a distributed multi-polar field winding, a series-wound armature winding and a commutator, a main brush displaced in one direction from neutral position and connected to one terminal of the field winding, the other terminal of the field winding being adapted to be connected to an operating circuit including a source of electrical energy, a second brush displaced in the same direction from its neutral position and located in position to create an armature pole at one side of the middle line of each field pole, a third brush displaced in the opposite direction from its neutral position and to a greater extent than the main brush and located in position to create an armature pole at the other side of the middle line of each field pole, and means for changing the connection from the operating circuit to either the second brush or the third brush respectively, whereby the armature may be caused to rotate in either direction with unequal torque.

GERRET REKERS.

Witnesses:
SOPHIA LEVINE,
GEORGE T. WHITNEY.

Copies of this patent may be obtained for five cents each, by addressing the "Commissioner of Patents, Washington, D. C."